(12) United States Patent
Graham et al.

(10) Patent No.: US 7,971,042 B2
(45) Date of Patent: Jun. 28, 2011

(54) MICROPROCESSOR SYSTEM AND METHOD FOR INSTRUCTION-INITIATED RECORDING AND EXECUTION OF INSTRUCTION SEQUENCES IN A DYNAMICALLY DECOUPLEABLE EXTENDED INSTRUCTION PIPELINE

(75) Inventors: Carl Norman Graham, London (GB); Simon Jones, London (GB); Seow Chuan Lim, Thatcham (GB); Yazid Nemouchi, Sandhurst (GB); Kar-Lik Wong, Wokinham (GB); Aris Aristodemou, Friern Barnet (GB)

(73) Assignee: Synopsys, Inc., Mountain View, CA (US)

( * ) Notice: Subject to any disclaimer, the term of this patent is extended or adjusted under 35 U.S.C. 154(b) by 208 days.

(21) Appl. No.: 11/528,338

(22) Filed: Sep. 28, 2006

(65) Prior Publication Data
US 2007/0074012 A1 Mar. 29, 2007

Related U.S. Application Data

(60) Provisional application No. 60/721,108, filed on Sep. 28, 2005.

(51) Int. Cl.
*G06F 9/30* (2006.01)
(52) U.S. Cl. ...................................................... 712/229
(58) Field of Classification Search ............... 712/20, 712/22, 23, 31, 34, 35, 43, 205, 229, 241
See application file for complete search history.

(56) References Cited

U.S. PATENT DOCUMENTS

| | | | |
|---|---|---|---|
| 4,594,659 | A | 6/1986 | Guenthner et al. |
| 4,829,460 | A | 5/1989 | Ito |
| 4,831,571 | A | 5/1989 | Tokumaru |
| 4,905,178 | A | 2/1990 | Mor et al. |
| 4,914,622 | A | 4/1990 | Sfarti et al. |
| 4,926,323 | A | 5/1990 | Baror et al. |
| 4,939,684 | A | 7/1990 | Gehrig et al. |
| 4,962,500 | A | 10/1990 | Nakagawa |
| 5,148,532 | A | 9/1992 | Narita et al. |

(Continued)

FOREIGN PATENT DOCUMENTS
EP 1 503595 2/2005
(Continued)

OTHER PUBLICATIONS

Smith, et al, "The Astronautics ZS-1 Processor", Proceedings of the International Conference on Computer Design : VLSI in Computers and Processors (ICCD). New York, 10/3-5; pp. 307-310.

(Continued)

*Primary Examiner* — David J Huisman
(74) *Attorney, Agent, or Firm* — Fenwick & West LLP

(57) ABSTRACT

Systems and methods for recording instruction sequences in a microprocessor having a dynamically decoupleable extended instruction pipeline. A record instruction including a record start address is sent to the extended pipeline. The extended pipeline thus begins recording the subsequent instruction sequence at the specified address until an end record instruction is encountered. The end record instruction is recorded as the last instruction in the sequence. The main pipeline may then call the instruction sequence by sending a run instruction including the start address for the desired sequence to the extended pipeline. This run instruction causes the extended pipeline to begin autonomously executing the recorded sequence until the end record instruction is encountered. This instruction causes the extended pipeline to cease autonomous execution and to return to executing instructions supplied by the main pipeline.

15 Claims, 8 Drawing Sheets

U.S. PATENT DOCUMENTS

| | | | |
|---|---|---|---|
| 5,155,698 A | 10/1992 | Niimi et al. | |
| 5,155,843 A | 10/1992 | Stamm et al. | |
| 5,220,670 A | 6/1993 | Arakawa et al. | |
| 5,295,250 A | 3/1994 | Komoto et al. | |
| 5,317,701 A | 5/1994 | Reininger et al. | |
| 5,327,536 A | 7/1994 | Suzuki | |
| 5,422,964 A | 6/1995 | Devimeux et al. | |
| 5,423,011 A | 6/1995 | Blaner | |
| 5,450,586 A | 9/1995 | Kuzara et al. | |
| 5,454,117 A | 9/1995 | Puziol et al. | |
| 5,475,856 A | 12/1995 | Kogge | |
| 5,493,687 A | 2/1996 | Garg et al. | |
| 5,509,129 A | 4/1996 | Guttag et al. | |
| 5,517,436 A | 5/1996 | Andreas et al. | |
| 5,530,825 A | 6/1996 | Black et al. | |
| 5,542,074 A | 7/1996 | Kim et al. | |
| 5,560,036 A | 9/1996 | Yoshida | |
| 5,586,279 A | 12/1996 | Pardo et al. | |
| 5,590,350 A | 12/1996 | Guttag et al. | |
| 5,590,351 A | 12/1996 | Sowadsky et al. | |
| 5,600,674 A | 2/1997 | Bonet et al. | |
| 5,600,847 A | 2/1997 | Guttag et al. | |
| 5,636,363 A | 6/1997 | Bourekas et al. | |
| 5,642,500 A | 6/1997 | Inone | |
| 5,655,122 A | 8/1997 | Wu | |
| 5,692,168 A | 11/1997 | McMahan | |
| 5,696,954 A | 12/1997 | Guttag et al. | |
| 5,696,958 A | 12/1997 | Mowry et al. | |
| 5,727,211 A | 3/1998 | Gulsen | |
| 5,752,014 A | 5/1998 | Mallick et al. | |
| 5,778,423 A | 7/1998 | Sites et al. | |
| 5,784,636 A | 7/1998 | Rupp | |
| 5,805,876 A | 9/1998 | Bose et al. | |
| 5,809,293 A | 9/1998 | Bridges et al. | |
| 5,826,100 A | 10/1998 | Bonet et al. | |
| 5,835,753 A | 11/1998 | Witt | |
| 5,848,264 A | 12/1998 | Baird et al. | |
| 5,884,057 A | 3/1999 | Blomgren et al. | |
| 5,892,847 A | 4/1999 | Johnson | |
| 5,896,305 A | 4/1999 | Bosshart et al. | |
| 5,907,498 A | 5/1999 | Rim | |
| 5,909,566 A | 6/1999 | Cai et al. | |
| 5,920,711 A | 7/1999 | Seawright et al. | |
| 5,923,892 A * | 7/1999 | Levy | 712/31 |
| 5,937,202 A | 8/1999 | Crosetto | |
| 5,948,099 A | 9/1999 | Crawford et al. | |
| 5,964,884 A | 10/1999 | Partovi et al. | |
| 5,978,909 A | 11/1999 | Lempel | |
| 5,996,071 A | 11/1999 | White et al. | |
| 6,014,743 A | 1/2000 | Henry et al. | |
| 6,026,478 A | 2/2000 | Dowling | |
| 6,038,649 A | 3/2000 | Ozawa et al. | |
| 6,044,458 A | 3/2000 | Rinkenberger et al. | |
| 6,061,521 A | 5/2000 | Thayer et al. | |
| 6,076,158 A | 6/2000 | Sites et al. | |
| 6,088,034 A | 7/2000 | Deering | |
| 6,088,786 A | 7/2000 | Feierbach et al. | |
| 6,141,673 A | 10/2000 | Thayer et al. | |
| 6,151,672 A | 11/2000 | Hunt | |
| 6,154,857 A | 11/2000 | Mann | |
| 6,157,988 A | 12/2000 | Dowling | |
| 6,185,732 B1 | 2/2001 | Mann et al. | |
| 6,189,091 B1 | 2/2001 | Col et al. | |
| 6,226,738 B1 | 5/2001 | Dowling | |
| 6,253,287 B1 | 6/2001 | Green | |
| 6,289,417 B1 | 9/2001 | Larri | |
| 6,292,879 B1 | 9/2001 | Fong | |
| 6,327,651 B1 | 12/2001 | Dubey et al. | |
| 6,339,822 B1 | 1/2002 | Miller | |
| 6,343,337 B1 | 1/2002 | Dubey et al. | |
| 6,353,882 B1 | 3/2002 | Hunt | |
| 6,377,970 B1 | 4/2002 | Abdallah et al. | |
| 6,412,038 B1 | 6/2002 | Mehalel | |
| 6,412,066 B2 | 6/2002 | Worrell et al. | |
| 6,427,206 B1 | 7/2002 | Yeh et al. | |
| 6,477,683 B1 | 11/2002 | Killian et al. | |
| 6,499,101 B1 | 12/2002 | Henry et al. | |
| 6,518,974 B2 | 2/2003 | Taylor et al. | |
| 6,519,696 B1 | 2/2003 | Henry et al. | |
| 6,526,502 B1 | 2/2003 | Col et al. | |
| 6,529,930 B1 | 3/2003 | Sazzad et al. | |
| 6,550,056 B1 | 4/2003 | Mizumoto et al. | |
| 6,560,754 B1 | 5/2003 | Hakewill et al. | |
| 6,571,331 B2 | 5/2003 | Henry et al. | |
| 6,584,585 B1 | 6/2003 | Patterson, Jr. | |
| 6,609,194 B1 | 8/2003 | Henry et al. | |
| 6,622,240 B1 | 9/2003 | Olson et al. | |
| 6,647,491 B2 | 11/2003 | Hsu et al. | |
| 6,671,743 B1 | 12/2003 | Verity | |
| 6,681,295 B1 | 1/2004 | Root et al. | |
| 6,718,460 B1 | 4/2004 | Prakash | |
| 6,718,504 B1 | 4/2004 | Coombs et al. | |
| 6,757,019 B1 | 6/2004 | Hsieh et al. | |
| 6,760,833 B1 | 7/2004 | Dowling | |
| 6,774,832 B1 | 8/2004 | Essenwanger | |
| 6,823,444 B1 | 11/2004 | Henry et al. | |
| 6,853,683 B2 | 2/2005 | Song et al. | |
| 6,865,663 B2 * | 3/2005 | Barry | 712/34 |
| 6,886,093 B2 | 4/2005 | Henry et al. | |
| 6,895,424 B2 | 5/2005 | Kirsch | |
| 6,909,744 B2 | 6/2005 | Molloy | |
| 6,925,634 B2 | 8/2005 | Hunter et al. | |
| 6,948,052 B2 | 9/2005 | Nguyen et al. | |
| 6,950,929 B2 * | 9/2005 | Chung et al. | 712/241 |
| 6,954,845 B2 | 10/2005 | Arnold et al. | |
| 6,963,554 B1 | 11/2005 | Weigand | |
| 6,968,444 B1 | 11/2005 | Kroesche et al. | |
| 6,981,012 B2 | 12/2005 | Kirsch | |
| 7,010,558 B2 | 3/2006 | Morris | |
| 7,050,504 B2 | 5/2006 | Joch et al. | |
| 7,079,147 B2 * | 7/2006 | Wichman et al. | 345/503 |
| 7,093,165 B2 | 8/2006 | Kageshima | |
| 7,162,619 B2 | 1/2007 | Henry et al. | |
| 7,180,943 B1 | 2/2007 | Arlid et al. | |
| 7,181,596 B2 | 2/2007 | Henry et al. | |
| 7,215,823 B2 | 5/2007 | Miura et al. | |
| 7,277,592 B1 | 10/2007 | Lin | |
| 7,336,720 B2 | 2/2008 | Martemyanov et al. | |
| 7,424,501 B2 | 9/2008 | Macy, Jr. | |
| 7,457,362 B2 | 11/2008 | Sankaran | |
| 7,539,714 B2 | 5/2009 | Macy, Jr. et al. | |
| 2001/0016903 A1 | 8/2001 | Tremblay | |
| 2001/0021974 A1 | 9/2001 | Lee | |
| 2001/0032309 A1 | 10/2001 | Henry et al. | |
| 2001/0040686 A1 | 11/2001 | Schoolcraft et al. | |
| 2001/0044892 A1 | 11/2001 | Yamaura | |
| 2001/0046260 A1 | 11/2001 | Molloy | |
| 2001/0050682 A1 | 12/2001 | Deering et al. | |
| 2001/0056531 A1 | 12/2001 | McFarling | |
| 2002/0025001 A1 | 2/2002 | Ismaeil et al. | |
| 2002/0053015 A1 | 5/2002 | Tan et al. | |
| 2002/0065860 A1 | 5/2002 | Grisenthwaite et al. | |
| 2002/0066006 A1 | 5/2002 | Worrell | |
| 2002/0069351 A1 | 6/2002 | Chi et al. | |
| 2002/0073301 A1 | 6/2002 | Kahle et al. | |
| 2002/0078332 A1 | 6/2002 | Seznec et al. | |
| 2002/0083312 A1 | 6/2002 | Sinharoy | |
| 2002/0087851 A1 | 7/2002 | Yoshioka | |
| 2002/0087852 A1 | 7/2002 | Jourdan et al. | |
| 2002/0100019 A1 | 7/2002 | Hunter et al. | |
| 2002/0100020 A1 | 7/2002 | Hunter et al. | |
| 2002/0138236 A1 | 9/2002 | Takamura | |
| 2002/0157000 A1 | 10/2002 | Hay et al. | |
| 2002/0188833 A1 | 12/2002 | Henry et al. | |
| 2002/0194238 A1 | 12/2002 | Kirsch | |
| 2002/0194461 A1 | 12/2002 | Henry et al. | |
| 2002/0194462 A1 | 12/2002 | Henry et al. | |
| 2002/0194463 A1 | 12/2002 | Henry et al. | |
| 2002/0194464 A1 | 12/2002 | Henry et al. | |
| 2002/0198916 A1 | 12/2002 | Kirsch | |
| 2002/0199092 A1 | 12/2002 | Henry et al. | |
| 2003/0023838 A1 | 1/2003 | Karim et al. | |
| 2003/0046614 A1 | 3/2003 | Brokish | |
| 2003/0070013 A1 | 4/2003 | Hansson | |
| 2003/0105793 A1 | 6/2003 | Guttag et al. | |
| 2003/0123748 A1 | 7/2003 | Sebot et al. | |
| 2003/0126508 A1 | 7/2003 | Litt | |

| | | |
|---|---|---|
| 2003/0131030 A1 | 7/2003 | Sebot et al. |
| 2003/0154359 A1 | 8/2003 | Henry et al. |
| 2003/0154463 A1 | 8/2003 | Betker et al. |
| 2003/0159009 A1 | 8/2003 | Henry et al. |
| 2003/0159020 A1 | 8/2003 | Henry et al. |
| 2003/0172252 A1 | 9/2003 | Henry et al. |
| 2003/0188129 A1 | 10/2003 | Henry et al. |
| 2003/0188130 A1 | 10/2003 | Henry et al. |
| 2003/0188131 A1 | 10/2003 | Henry et al. |
| 2003/0188133 A1 | 10/2003 | Henry et al. |
| 2003/0188140 A1 | 10/2003 | Henry et al. |
| 2003/0196077 A1 | 10/2003 | Henry et al. |
| 2003/0204705 A1 | 10/2003 | Oldfield et al. |
| 2003/0221091 A1 | 11/2003 | Henry et al. |
| 2003/0225998 A1 | 12/2003 | Khan et al. |
| 2004/0015683 A1 | 1/2004 | Emma et al. |
| 2004/0049660 A1 | 3/2004 | Jeppesen et al. |
| 2004/0054877 A1 | 3/2004 | Macy et al. |
| 2004/0068643 A1 | 4/2004 | Dowling |
| 2004/0103263 A1* | 5/2004 | Colavin et al. .................. 712/15 |
| 2004/0139281 A1 | 7/2004 | McDonald |
| 2004/0172524 A1 | 9/2004 | Hoogerbrugge |
| 2004/0186985 A1 | 9/2004 | Tran et al. |
| 2004/0193843 A1 | 9/2004 | Altshuler et al. |
| 2004/0193852 A1 | 9/2004 | Johnson |
| 2004/0193855 A1 | 9/2004 | Kacevas et al. |
| 2004/0225870 A1 | 11/2004 | Srinivasan et al. |
| 2004/0225871 A1 | 11/2004 | Irie et al. |
| 2004/0225872 A1 | 11/2004 | Bonanno et al. |
| 2004/0225949 A1 | 11/2004 | Coombs |
| 2004/0230782 A1 | 11/2004 | Busaba et al. |
| 2004/0250045 A1 | 12/2004 | Dowling |
| 2004/0254965 A1 | 12/2004 | Giernalczyk et al. |
| 2004/0255100 A1 | 12/2004 | Kershaw |
| 2004/0255104 A1 | 12/2004 | Akkary et al. |
| 2004/0267856 A1 | 12/2004 | Macy |
| 2004/0268102 A1 | 12/2004 | Combs et al. |
| 2005/0027970 A1 | 2/2005 | Arnold et al. |
| 2005/0027971 A1 | 2/2005 | Williams et al. |
| 2005/0027974 A1 | 2/2005 | Lempel |
| 2005/0050309 A1 | 3/2005 | Yamashita et al. |
| 2005/0060457 A1 | 3/2005 | Olukotun |
| 2005/0066305 A1 | 3/2005 | Lisanke et al. |
| 2005/0076193 A1 | 4/2005 | Henry et al. |
| 2005/0091479 A1 | 4/2005 | Chung |
| 2005/0097398 A1 | 5/2005 | Day et al. |
| 2005/0102492 A1 | 5/2005 | Henry et al. |
| 2005/0125613 A1 | 6/2005 | Kim et al. |
| 2005/0125632 A1 | 6/2005 | Alsup et al. |
| 2005/0125634 A1 | 6/2005 | Ishizuka |
| 2005/0132175 A1 | 6/2005 | Henry et al. |
| 2005/0138607 A1 | 6/2005 | Lu |
| 2005/0154867 A1 | 7/2005 | DeWitt, Jr. et al. |
| 2005/0169550 A1 | 8/2005 | Arnold et al. |
| 2005/0172277 A1 | 8/2005 | Chheda et al. |
| 2005/0174270 A1 | 8/2005 | Koo et al. |
| 2005/0188179 A1 | 8/2005 | Henry et al. |
| 2005/0204121 A1 | 9/2005 | Burdass |
| 2005/0216703 A1 | 9/2005 | Dieffenderfer et al. |
| 2005/0216713 A1 | 9/2005 | Prasky et al. |
| 2005/0223202 A1 | 10/2005 | Peri et al. |
| 2005/0273559 A1 | 12/2005 | Aristodemou et al. |
| 2005/0273581 A1 | 12/2005 | Arnold et al. |
| 2005/0278505 A1 | 12/2005 | Lim et al. |
| 2005/0278513 A1 | 12/2005 | Aristodemou et al. |
| 2005/0278517 A1 | 12/2005 | Wong et al. |
| 2005/0289321 A1 | 12/2005 | Hakewill et al. |
| 2005/0289323 A1 | 12/2005 | Wong et al. |
| 2006/0015702 A1 | 1/2006 | Khan et al. |
| 2006/0015706 A1 | 1/2006 | Lai |
| 2006/0036836 A1 | 2/2006 | Gelman et al. |
| 2006/0041868 A1 | 2/2006 | Huang |
| 2006/0047934 A1 | 3/2006 | Schmisseur et al. |
| 2006/0095713 A1 | 5/2006 | Boggs et al. |
| 2007/0070080 A1 | 3/2007 | Graham et al. |
| 2007/0071101 A1 | 3/2007 | Topham |
| 2007/0071106 A1 | 3/2007 | Graham et al. |
| 2007/0073925 A1 | 3/2007 | Lim et al. |
| 2007/0074004 A1 | 3/2007 | Wong et al. |
| 2007/0074007 A1 | 3/2007 | Topham et al. |
| 2007/0074012 A1 | 3/2007 | Graham et al. |

FOREIGN PATENT DOCUMENTS

| | | |
|---|---|---|
| GB | 2365583 | 2/2002 |
| WO | WO-93-08526 | 4/1993 |
| WO | WO 2005/114441 A2 | 12/2005 |
| WO | WO 2006/096612 A2 | 9/2006 |
| WO | WO 2007/049150 A2 | 5/2007 |
| WO | WO 2008/147565 A2 | 12/2008 |

OTHER PUBLICATIONS

Altera, Flex 10K—Embedded Programmable Logic Device Family. 2003. Altera, pp. 1,6.

Gilson, K.L. et al., "The Nano Processor: A Low Resource Reconfigurable Processor," IEEE Workshop on FPGAs for Custom Computing Machines, Apr. 11, 2004, p. 2, col. 2, paragraphs 3-4; p. 3, col. 1, paragraph 3 to col. 2, paragraph 2; p. 5, col. 1, paragraph 6 to col. 1, paragraph 3; and Figure 2.

Hennessy, J.L. et al., "A Computer Architecture: A Quantitative Approach," Morgan Kaufman Publishers, 2003, pp. 197-199.

Hewlett-Packard, "PA-RISC 2.0," 1995, pp. 6-4, 6-5 & 7-58.

Lee et al., Branch Prediction Strategies and Branch Target Buffer Design, IEEE Computer, 1984, pp. 6-22.

McFarling et al., Reducing the Cost of Branches, IEEE, 1986, pp. 396-403.

Osako, F. et al., "A Dynamic Computation Resource Scalable Algorithm for Software Video CODEC," NTG Fachberichte, VDE Verlag, 143:515-518 ; Sep. 10, 1997.

PCT International Search Report, PCT Application No. PCT/IB2006/003358, Oct. 24, 2007, 5 pages.

PCT International Search Report, PCT Application No. PCT/US2008/006705, Nov. 28, 2008, 2 pages.

PCT Written Opinion, PCT Application No. PCT/US05/17586, Nov. 27, 2006, 12 pages.

Sherwood et al. Automated Design of Finite State Machine Predictors for Customized Processors, 2001, IEEE, pp. 86-97.

Texas Instruments, "TMS320C62xx CPU and Instruction Set Reference Guide," Jul. 1997, pp. 3-25 & 3-90.

TriMedia, "TM1000 Preliminary Data Book," 1997, pp. A23-A33.

United States Office Action, U.S. Appl. No. 11/528,434, Sep. 2, 2008, 15 pages.

United States Office Action, U.S. Appl. No. 11/132,448, Jan. 8, 2009, 11 pages.

United States Office Action, U.S. Appl. No. 11/132,448, Jul. 18, 2008, 11 pages.

United States Office Action, U.S. Appl. No. 11/132,432, Jul. 3, 2007, 8 pages.

United States Office Action, U.S. Appl. No. 11/132,424, Mar. 31, 2010, 19 pages.

United States Office Action, U.S. Appl. No. 11/132,424, Sep. 16, 2009, 20 pages.

United States Office Action, U.S. Appl. No. 11/132,428, Mar. 19, 2008, 10 pages.

United States Office Action, U.S. Appl. No. 11/132,428, Jun. 7, 2007, 8 pages.

United States Office Action, U.S. Appl. No. 11/132,447, Jul. 18, 2007, 19 pages.

United States Office Action, U.S. Appl. No. 11/132,447, Feb. 27, 2007, 20 pages.

United States Office Action, U.S. Appl. No. 11/528,326, May 13, 2008, 18 pages.

United States Office Action, U.S. Appl. No. 11/528,325, May 12, 2010, 12 pages.

United States Office Action, U.S. Appl. No. 11/528,325, Sep. 30, 2009, 11 pages.

United States Office Action, U.S. Appl. No. 11/528,327, Oct. 5, 2009, 7 pages.

United States Office Action, U.S. Appl. No. 11/528,470, Sep. 2, 2008, 15 pages.

United States Office Action, U.S. Appl. No. 11/132,423, Jan. 22, 2008, 14 pages.
United States Office Action, U.S. Appl. No. 11/132,423, Jun. 22, 2007, 19 pages.
United States Office Action, U.S. Appl. No. 11/132,423, Feb. 27, 2007, 14 pages.

Wiegand, T. et al., "Rate-Constrained Coder Control and Comparison of Video Coding Standards," IEEE Transactions on Circuits and Systems for Video Technology, 13(7):688-703; Jul. 1, 2003.

* cited by examiner

Figure 5

```
# code fragment A
L0:     push_s          r3
        mov_s           r3,r6
        cmp_s           r3,0
        mov.gt          lp_count,r13
        lpgb            L2 start of extension instructions
L1:     vld128          vr01,[i,0]
        vld128          vr02,[i0,0x10]
        vmrb            vr01,vr02,vr01 end of loop body
L2:     vbmulf          vr01,vr01,r10
        vavrb           vr01,vr01,vr03
        vst128          vr01,[i3]
        vaddw           vr00,vr00,vr23 end of extension instructions
L3:     prop_s          r13
```

Figure 6

```
# code fragment B

L0:         push_s      r13
                mov_s       r13,r6
                cmp_s       r13,0
                mov.gt      lp_count,r13
                mov         r14,L100
                lpgt        L2 start of extension instructions

L5:         vrun        r14 end of extension instructions

L3:         pop_s       r13
```

Figure 7 code fragment C

```
        push_s      r13
        mov_s       r13,r6
        cmp_s       r13,0
        mov         r14,L100
        mov.gt      lp_count,r13
``` start of extension instructions

```
L1A:    vrec        r14     # r4=L100

L1:     vld128      vr01,[i0]
        vld128      vr02,[i0,0x10]
        vmrb        vr01,vr02,vr01
        vld128      vr03,[i1]

L2:     vbmulf      rr01,vr01,r10
        varb        vr01,vr01,vr03
        vst         vr01,[i3]

L2A:    breg        r4,r5,L2C
L2B:    vaddw       vr00,vr00,vr23
L2C:    vendrec     r15
``` end of extension instruction

```
        lpgt        L2
L5:     vrun        r14
L3:     pop_s       r13
```

MICROPROCESSOR SYSTEM AND METHOD FOR INSTRUCTION-INITIATED RECORDING AND EXECUTION OF INSTRUCTION SEQUENCES IN A DYNAMICALLY DECOUPLEABLE EXTENDED INSTRUCTION PIPELINE

CROSS REFERENCE TO RELATED APPLICATIONS

This application claims priority to U.S. Provisional Patent Application No. 60/721,108 titled "SIMD Architecture and Associated Systems and Methods," filed Sep. 28, 2005, the disclosure of which is hereby incorporated by reference in its entirety.

FIELD OF THE INVENTION

The invention relates generally to embedded microprocessor architecture and more specifically to systems and methods for recording instruction sequences in microprocessor-based systems.

BACKGROUND OF THE INVENTION

Processor extension logic is utilized to extend a microprocessor's capability.

Typically, this logic is in parallel and accessible by the main processor pipeline. It is often used to perform specific, repetitive, computationally intensive functions thereby freeing up the main processor pipeline.

In conventional microprocessors, there are essentially two types of parallel pipeline architectures: tightly coupled and loosely or decoupled. In the former, instructions are fetched and executed serially in the main processor pipeline. If the instruction is an instruction to be processed by the extension logic, the instruction is sent to that logic.

However, every instruction comes from the main pipeline, thus the two pipelines are said to be tightly coupled. Also, transporting each instruction to be executed by the extension logic with the main instruction pipeline requires significant overhead, reducing the efficiency gains provided by the extension logic.

In the second architecture, the parallel pipeline containing the extension logic is capable of fetching and executing its own instructions. However, control and synchronization becomes difficult when programming a processor having such a decoupled architecture.

Thus, there exists a need for a parallel pipeline architecture that can fully exploit the advantages of parallelism without suffering from the design complexity of loosely or completely decoupled pipelines.

SUMMARY OF THE INVENTION

In view of the foregoing, at least one embodiment of the invention may provide a method of recording processor extension instruction sequences for a CPU (central processing unit) employing processor extensions. The method according to this embodiment may comprise issuing a sequence record instruction to a processor extension, including a memory address to record to, issuing a processor instruction sequence to the processor extension to be recorded, and issuing a sequence record end instruction to the processor extension, wherein the CPU can make future calls to the processor instruction by merely referencing the instruction address specified in the sequence record instruction.

Accordingly, at least one embodiment of the invention provides a microprocessor architecture. The microprocessor architecture according to this embodiment comprises a main instruction pipeline, and an extended instruction pipeline, wherein the main instruction pipeline is configured to issue a begin record instruction to the extended instruction pipeline, causing the extended instruction pipeline to begin recording a sequence of instructions issued by the main instruction pipeline.

Another embodiment of the invention provides A method of recording instruction sequences in a microprocessor-based system having an main instruction pipeline and an extended instruction pipeline. The method according to this embodiment comprises sending a record instruction from the main instruction pipeline to the extended instruction pipeline to cause the extended instruction pipeline to begin recording an instruction sequence, and sending an end record instruction from the main instruction pipeline to the extended instruction pipeline to cause the extended instruction pipeline to stop recording the instruction sequence.

Still a further embodiment of the invention provides in a microprocessor-based system comprising a main instruction pipeline and an extended instruction pipeline, a method of recording instruction sequences for the extended instruction pipeline to reduce microprocessor overhead. The method according to this embodiment comprises issuing a begin record instruction from the main instruction pipeline to the extended instruction pipeline, the begin record instruction including a starting address to begin storing an instruction sequence, subsequently recording an instruction sequence supplied by the main instruction pipeline, and issuing an end record instruction from the main instruction pipeline to the extended instruction pipeline causing the extended processor pipeline to record the end record instruction as the last instruction in the sequence, wherein future calls to the recorded sequence are made by sending a run instruction from the main instruction pipeline to the extended instruction pipeline, the run instruction specifying the starting address of the recorded instruction sequence and causing the extended processor pipeline to begin a mode of autonomous operation until the end record instruction is encountered.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 5 is a code fragment containing an example of a processor extension instruction sequence that is issued to the processor extension in accordance with various embodiments of the invention;

FIG. 6 is a code fragment in which a processor extension instruction is preloaded to a memory location and then run from that location by the processor extension in accordance with various embodiments of the invention;

FIG. 7 is a code fragment containing an example of an extension instruction sequence that is being issued and simultaneously captured and recorded in accordance with at least one embodiment of the invention.

DETAILED DESCRIPTION

The following description is intended to convey a thorough understanding of the embodiments described by providing a number of specific embodiments and details involving microprocessor architecture and systems and methods for recording instruction sequences in microprocessor-based systems. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Commonly assigned U.S. patent application Ser. No. 11/528,434 titled "System and Method for Selectively Decoupling a Parallel Extended Processor Pipeline," filed concurrently with this application is hereby incorporated by reference in its entirety into the disclosure of this application.

Figure 1:
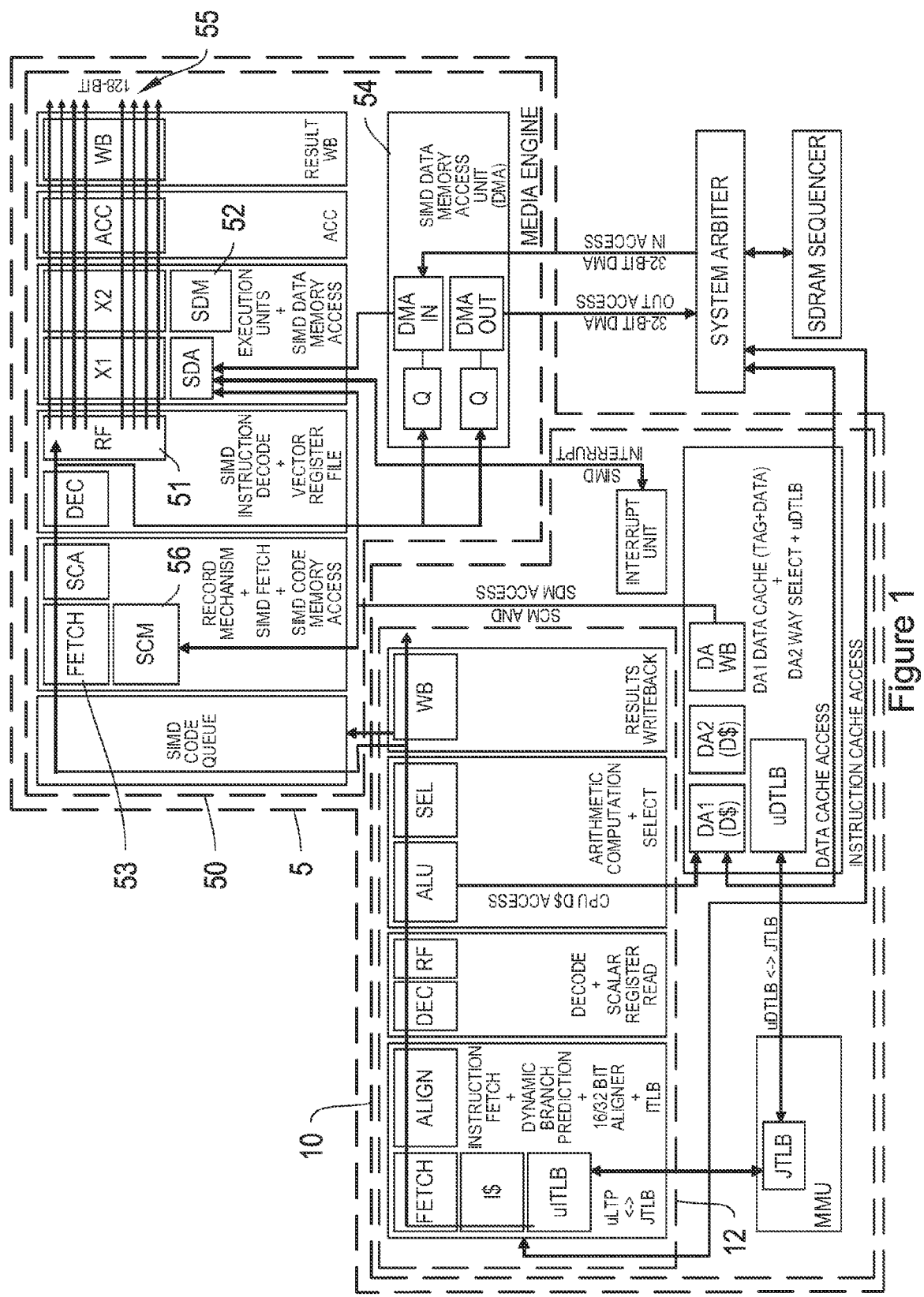
FIG. 1 is a functional block diagram illustrating a microprocessor-based system including a main processor core and a SIMD media accelerator according to at least one embodiment of the invention.

Referring now to FIG. 1, a functional block diagram illustrating a microprocessor-based system 5 including a main processor core 10 and a SIMD media accelerator 50 according to at least one embodiment of the invention is provided. The diagram illustrates a microprocessor 5 comprising a standard single instruction single data (SISD) processor core 10 having a multistage instruction pipeline 12 and a SIMD media engine 50. In various embodiments, the processor core 10 may be a processor core such as the ARC 700 embedded processor core available from ARC, International of Elstree, United Kingdom, and as described in provisional patent application number 60/572,238 filed May 19, 2004 entitled "Microprocessor Architecture" which, is hereby incorporated by reference in its entirety. Alternatively, in various embodiments, the processor core may be a different processor core.

In various embodiments, a single instruction issued by the processor pipeline 12 may cause up to 16 16-bit elements to be operated on in parallel through the use of the 128-bit data path 55 in the media engine 50. In various embodiments, the SIMD engine 50 utilizes closely coupled memory units. In various embodiments, the SIMD data memory 52 (SDM) is a 128-bit wide data memory that provides low latency access to and from the 128-bit vector register file 51. The SDM contents are transferable via a DMA unit 54 thereby freeing up the processor core 10 and the SIMD core 50. In various embodiments, a SIMD code memory 56 (SCM) allows the SIMD unit to fetch instructions from a localized code memory via the Fetch stage 53 of its pipeline, allowing the SIMD pipeline to dynamically decouple from the processor core 10 resulting in truly parallel operation between the processor core and SIMD media engine.

Therefore, in various embodiments, the microprocessor architecture will permit the processor-based system 5 to operate in both closely coupled and decoupled modes of operation. In the closely coupled mode of operation, the SIMD program code fetch is exclusively handled by the main processor core 10. In the decoupled mode of operation, the SIMD pipeline 50 executes code fetched from a local memory 56 independent of the processor core 10. The processor core 10 may therefore instruct the SIMD pipeline 50 to execute autonomously in this de-coupled mode, for example, to perform video tasks such as audio processing, entropy encoding/decoding, discrete cosine transforms (DCTs) and inverse DCTs, motion compensation and de-block filtering.

Figure 2:
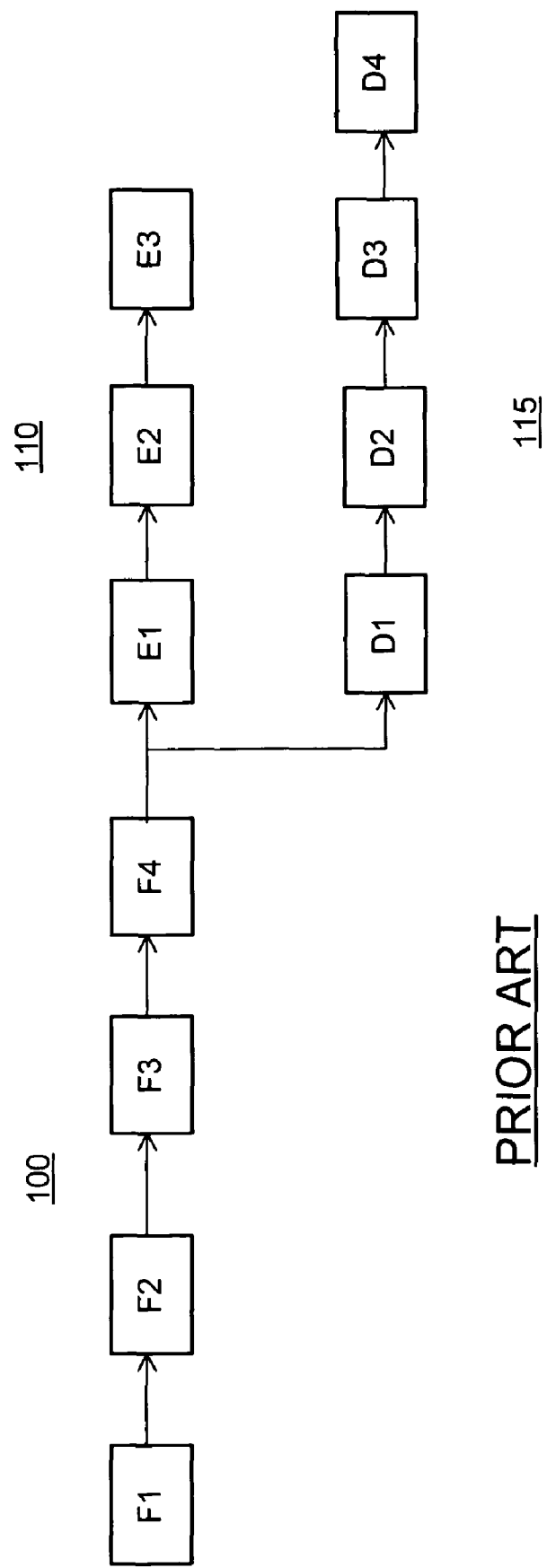
FIG. 2 is a block diagram illustrating a conventional multistage microprocessor pipeline having a pair of parallel data paths.

Referring now to FIG. 2, a block diagram illustrating a conventional multistage microprocessor pipeline having a pair of parallel data paths is depicted. In a microprocessor employing a variable-length pipeline, data paths required to support different instructions typically have a different number of stages. Data paths supporting specialized extension instructions for performing digital signal processing or other complex but repetitive functions may be used only some of the time during processor execution and remain idle otherwise. Thus, whether or not these instructions are currently needed will effect the number of effective stages in the processor pipeline.

Extending a general-purpose microprocessor with application specific extension instructions can often add significant length to the instruction pipeline. In the pipeline of FIG. 2, pipeline stages F1 to F4 at the front end 100 of the processor pipeline are responsible for functions such as instruction fetch, decode and issue. These pipeline stages are used to handle all instructions issued by the microprocessor. After these stages, the pipeline splits into parallel data paths 110 and 115 incorporating stages E1-E3 and D1-D4 respectively. These parallel sub-paths represent pipeline stages used to support different instructions/data operations. For example, stages E1-E3 may be the primary/default processor pipeline, while stages D1-D4 comprise the extended pipeline designed for processing specific instructions. This type of architecture can be characterized as coupled or tightly coupled to the extent that regardless of whether instructions are destined for default pipeline stages E1-E3 or extended pipeline D1-D4, they all must pass through stages F1-F4, until a decision is made as to which portion of the pipeline will perform the remaining processing steps.

By using the single pipeline front-end to fetch and issue all instructions, the processor pipeline of FIG. 2 achieves the advantage that instructions can be freely intermixed, irrespectively of whether the instructions are executed by the data path in sub-paths E1-E3 or D1-D4. Thus, all instructions appear as a single thread of program execution. This type of pipeline architecture also has the advantage of greatly simplified program design and debugging, thereby reducing the time to market in product developments. It is admittedly a highly flexible architecture. However, a limitation of this architecture is that the sequential nature of instruction execution significantly limits the exploitable parallelism between the data paths that could otherwise be used to improve overall performance. This negatively effects performance relative to other parallel pipeline architectures.

Figure 3:
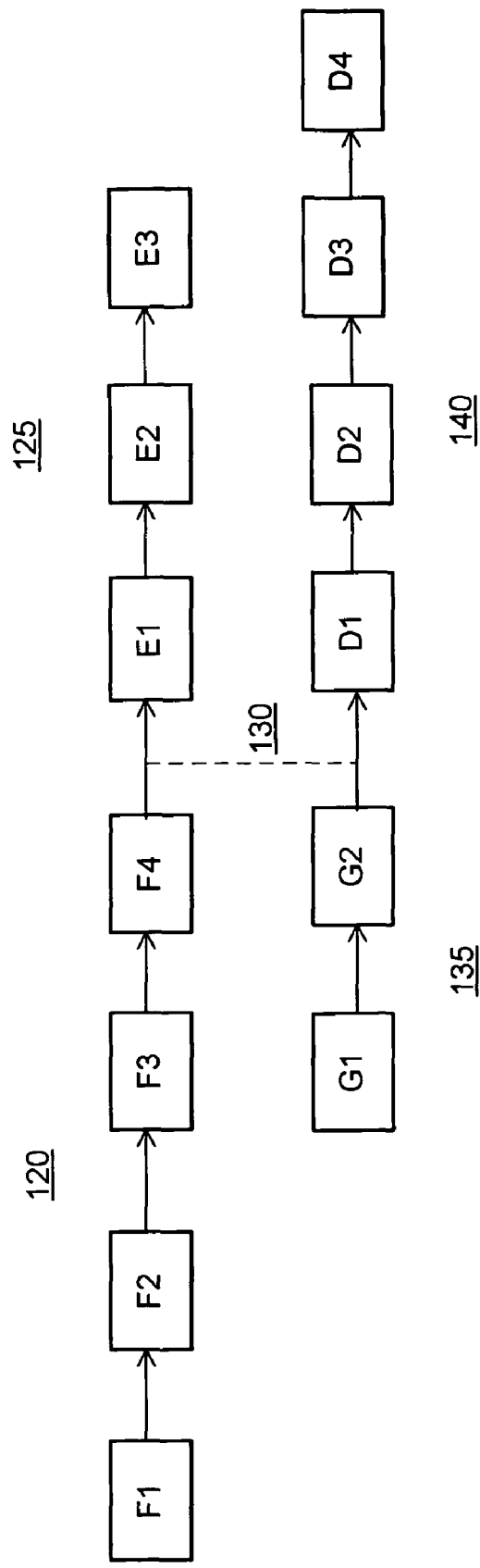
FIG. 3 is a block diagram illustrating another conventional multiprocessor design having a pair of parallel processor pipelines.

FIG. 3 is a block diagram illustrating another conventional multiprocessor architecture having a pair of parallel instruction pipelines. The processor pipeline of FIG. 3 contains a front end 120 comprised of stages F1-F4 and a rear portion 125 comprised of stages E1-E3. However, the processor also contains a parallel data path having a front end 135 comprised of front end stages G1-G2 and rear portion 140 comprised of stages D1-D4. Unlike the architecture of FIG. 2, this architecture contains truly parallel pipelines to the extent that both front portions 420 and 435 each can fetch instructions separately. This type of parallel architecture may be characterized as loosely coupled or decoupled because the application specific extension data path G1-G2 and D1-D4 is autonomous and can execute instructions in parallel to the main pipeline consisting of F1-F4 and E1-E3. This arrangement enhances exploitable parallelism over the architecture depicted in FIG. 2. However, as the two parallel pipelines become independent, mechanisms are required to synchronize their operations, as represented by dashed line 130. These mechanisms, typically implemented using specific instructions and bus structures which, are often not a natural part of a program and are inserted as after-thoughts to "fix" the disconnect between main pipeline and extended pipeline. As consequence of this, the resulting program utilizing both instruction pipelines becomes difficult to design and optimize.

Figure 4:
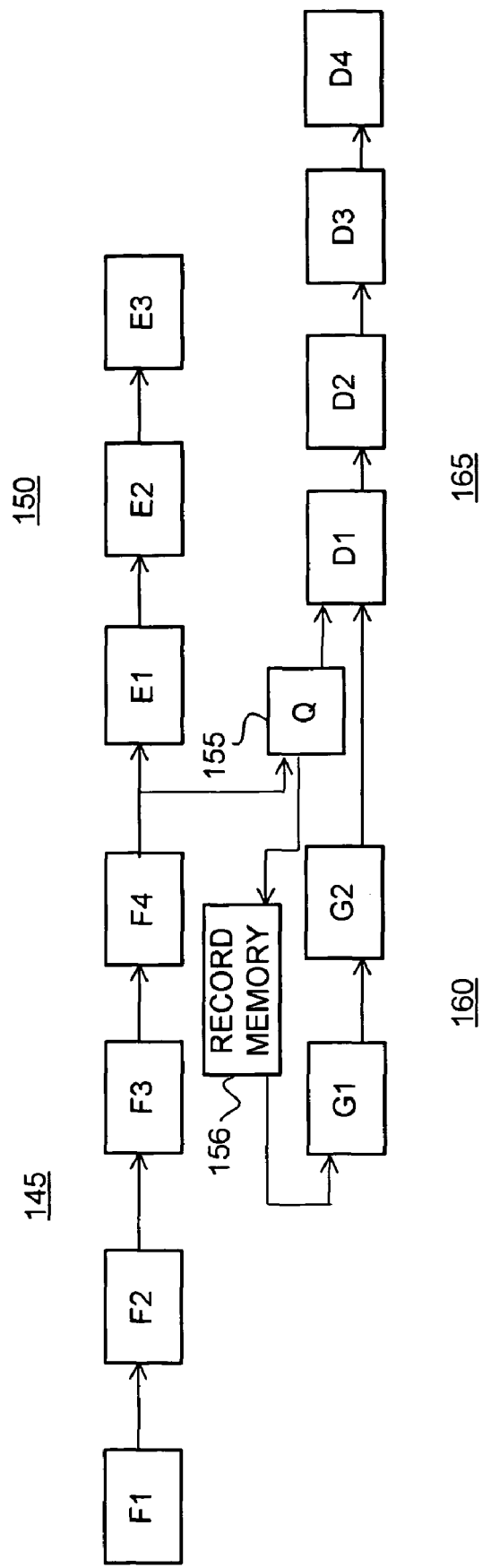
FIG. 4 is a block diagram illustrating a dynamically decoupleable multi-stage microprocessor pipeline including an instruction sequence record memory according to at least one embodiment of the invention.

Referring now to FIG. 4, a block diagram illustrating a dynamically decoupleable multi-stage microprocessor pipeline including an instruction sequence record memory according to at least one embodiment of the invention is provided. The pipeline architecture according to this embodiment ameliorates at least some and preferably most or all of the above-noted limitations of conventional parallel pipeline architectures. This exemplary pipeline depicted in FIG. 4 consists of a front end portion 145 comprising stages F1-F4, a rear portion 150 comprising stages E1-E3, and a parallel extendible pipeline having a front portion 160 comprising stages G1-G2 and a rear portion 165 comprising stages D1-D4. In the pipeline depicted in FIG. 4, instructions can be issued from the main processor pipeline F1-F4 to the extended pipeline D1 to D4. To decouple the extendible pipeline D1 to D4 from the front portion 145 of the main pipeline F1 to F4, a queue 155 is added between the two pipelines. The queue serves to delay execution of instructions issued by the front end portion 145 of the main pipeline if the extension pipeline is not ready. A tradeoff can be made during system design to decide on how many entries should be in the queue 155 to insure that the extension pipeline is sufficiently decoupled from the main pipeline. The architecture of FIG. 4 also includes a record memory 156 coupled to the queue 155 and the front end of the parallel extended pipeline G1-G2. In various embodiments, as will be discussed in greater detail in the context of FIGS. 5-8, instructions sequences can be recorded in the record memory 156.

Additionally, in various embodiments, the main pipeline can issue a Sequence Run (vrun) instruction to instruct the extension pipeline to execute an instruction sequence in the record memory 156, causing the extension pipeline to use its own front end 160, G1 to G2 in the diagram, to fetch and execute instructions autonomously. In various embodiments, while the extension pipeline, G1-G2 and D1-D4, is performing operations, the main pipeline can keep issuing extension instructions that accumulate in the queue 155 until the extension pipeline executes a Sequence Record End (vendrec) instruction. After the vendrec instruction is issued, the extension resumes executing instructions issued to the queue 155.

Therefore, instead of trying to get what effectively becomes two independent processors to work together as in the pipeline depicted in FIG. 3, the pipeline depicted in FIG. 4 is designed to switch between being coupled, that is, executing instructions for the main pipeline front end 145, and being decoupled, that is, during autonomous runtime of the extended pipeline. As such, the instructions vrun and vendrec, which dynamically switch the pipeline between the coupling states, can be designed to be light weight, executing in, for example, a single cycle. These instructions can then be seen as parallel analogs of the conventional call and return instructions. That is, when instructing the extension pipeline to fetch and execute instructions autonomously, the main processor pipeline is issuing a parallel function call that runs concurrently with its own thread of instruction execution to maximize speedup of the application. The two threads of instruction execution eventually join back into one after the extension pipeline executes the vendrec instruction which is the last instruction of the program thread autonomously executed by the extension pipeline.

In addition to efficient operation, another advantage of this architecture is that during debugging, such as, for example, instruction stepping, the two parallel threads can be forced to be serialized such that the CPU front portion 145 will not issue any instruction after issuing vrun to the extension pipeline until the latter fetches and executes the vendrec instruction. In various embodiments, this will give the programmer the view of a single program thread that has the same functional behavior of the parallel program when executed normally and hence will greatly simplify the task of debugging.

Another advantage of the processor pipeline containing a parallel extendible pipeline that can be dynamically coupled and decoupled is the ability to use two separate clock domains. In low power applications, it is often necessary to run specific parts of the integrated circuit at varying clock frequencies, in order to reduce and/or minimize power consumption. Using dynamic decoupling, the front end portion 145 of the main pipeline can utilize an operating clock frequency different from that of the parallel pipeline 165 of stages D1-D4 with the primary clock partitioning occurring naturally at the queue 155 labeled as Q in the FIG. 4.

As discussed above in the context of FIG. 1, general purpose microprocessors, including embedded microprocessors, are sometimes extended with co-processors, additional extension instructions, and/or pipeline extensions, all collectively referred to hereafter as "processor extensions." A processor extension typically supports specialized instructions that hugely accelerate the computation required by the application that the instruction is designed for. For example, SIMD extension instructions can be added to a processor to improve performance of applications with high degree of data parallelism. Traditionally, there are two ways by which such specialized instructions are issued. Firstly, the instructions can be issued directly from the CPU or main processor pipeline to the processor extension through a tightly coupled interface as discussed above in the context of FIG. 2. Secondly, the CPU can preload the instructions into specific memory locations and the processor extension is then instructed by the CPU to fetch and execute the preloaded instructions from memory so that the processor extensions are largely decoupled from the CPU, as discussed in the context of FIG. 3.

In view of the shortcomings of these two traditional methods, various embodiments of this invention propose an innovative alternative in which processor extension instructions are issued by the CPU (main processor pipeline) and dynamically captured into a processor extension memory or processor extension instruction buffer/queue for subsequent retrieval and playback. In various embodiments, processor extension instructions can optionally be executed by the processor extensions as they are captured and recorded.

By way of example, consider code fragment A of FIG. 5. In this code fragment, all instructions from statement L1 to just before statement L3 are to be issued to the extended instruction pipeline. In this case, these extension instructions are intermixed with general-purpose instructions and the extension instructions are issued to the processor extension by the CPU, through retrieval of the instructions from CPU instruction memory.

One problem with this approach is that intermixing instructions makes execution in the CPU and the processor extension difficult to decouple. Additionally, extension instruction sequences are typically used in several places in an application. However, the way that these instructions are included in code fragment A does not allow for reductions in overall code size. An increase in overhead to the standard CPU code execution performance is also associated with the issuing of extension instructions due to the number of cycles consumed in the transport of processor extension instructions as well as the CPU instruction cache occupancy overhead due to storage of processor extension instructions.

As an alternative to this approach of loading instructions whenever they are needed, in various embodiments of the invention, an extension instruction sequence can be preloaded into some specific memory location from which the processor extension logic is directed to fetch such instructions, as shown in code fragment B in FIG. 6. In code fragment B, the extension instruction sequence is preloaded to location L100 and then a Sequence Run (vrun) instruction is issued in statement L5 to direct the processor extension to fetch and execute the sequence. However, to dynamically preload such a sequence in a CPU with load/store architecture, each instruction has first to be loaded into a register in the CPU and then stored at the desired location, requiring at least 2 instructions (a load and a store). Additional overhead is also incurred by the need to track the number of instructions to be loaded and to increment the addresses of the targeted memory locations. Furthermore, if the extension instruction sequence is adaptive, that is, based upon the run-time conditions in the CPU, the preloading routine, referred to as the preloader, would need linking functionalities to modify the sequence while preloading. Such functionalities add to the preloading overhead. An example of adaptation is L2 in code fragment A of FIG. 5 in which a CPU register r10 is read in additional to the extension register vr01. The cumulative effect of all these overheads can significantly reduce application performance if the extension instruction sequences have to be dynamically reloaded relatively frequently as is likely in video processing applications.

Thus, in various embodiments, this invention introduces a scheme by which, instead of preloading, extension instruction sequences can be captured on-the-fly, that is, while such instructions are being issued from the CPU, and recorded to specific memory locations accessible by the extension logic. The instructions being recorded can also be optionally executed by the processor extension, further reducing the recording overhead.

Referring now to the code fragment C in FIG. 7, in this fragment the Sequence Record (vrec) instruction in statement L1A initiates a recording session to record all extension instructions issued by the CPU to the memory locations starting at L100. The Sequence Record End (vendrec) instruction in statement L2C terminates the recording session. This type of record instruction is referred to herein as an instruction macro. Once the instruction macro is recorded, the CPU can then direct the processor extension to fetch and execute the instruction macro using only the vrun instruction, for example, in statement L5 of code segment C. The overhead in recording the macro is now constrained by the rate in which the CPU can issue extension instructions, which is typically one instruction per cycle, and is significantly less than the overhead in instruction preloading. Also, it becomes trivial to adapt the instruction macro based on runtime conditions in the CPU. There are two such examples of adaptation in code fragment C. In the first example, when issuing the vbmulf instruction in statement L2, the CPU can read its own register r10 and its value is issued directly to the processor extension together with the instruction and recorded into the macro. In the second example, the breq instruction in statement L2A is actually a conditional branch instruction of the CPU that depends on the contents of the CPU registers r4 and r5. If this branch is taken, the vaddw instruction in statement L2B will not be issued to the processor extension and hence not recorded. In various embodiments, a mechanism is used to keep track of address locations in the SCM such that during the recording of subsequent additional instruction sequences, previous instruction sequences are not overwritten and such that different instruction sequence start addresses are maintained by the main processor core.

A further advantage of instruction recording over preloading is the elimination of the requirement to load the extension instruction sequences into data cache using the preloader, which would have polluted the data cache and thereby reduce overall efficiency of the CPU. Furthermore, by replacing the vrec instruction in statement L1A by the Sequence Record And Run (vrecrun) instruction, the instruction being captured and recorded is also executed by the processor extension and the overhead of instruction recording is thereby reduced or even minimized. Once recorded, an instruction macro can be used in the same way as a preloaded instruction sequence and has the same benefits of code reuse and simplifying decoupled execution. In various embodiments, the record mechanism can coexist with the preloading mechanism, that is, the two mechanisms are not necessarily mutually exclusive. As an example, preloading may still be useful for preloading macros that do not require frequent reloading in runtime.

In various embodiments, in order to increase and ideally maximize flexibility, the processor extension can operate in one of two modes. In various embodiments, after executing the Sequence Run (vrun) instruction, the processor extension may switch to an autonomous mode in which it fetches and execute instructions in a pre-recorded macro on its own. After executing the Sequence Record End (vendrec) instruction that signifies the end of an instruction macro, the processor extension may switch back to the normal operating mode, in which the CPU provides all further processor extension instructions. As a result of this flexibility, this recording scheme combines all the benefits of direct instruction issuing and preloading.

Figure 8:
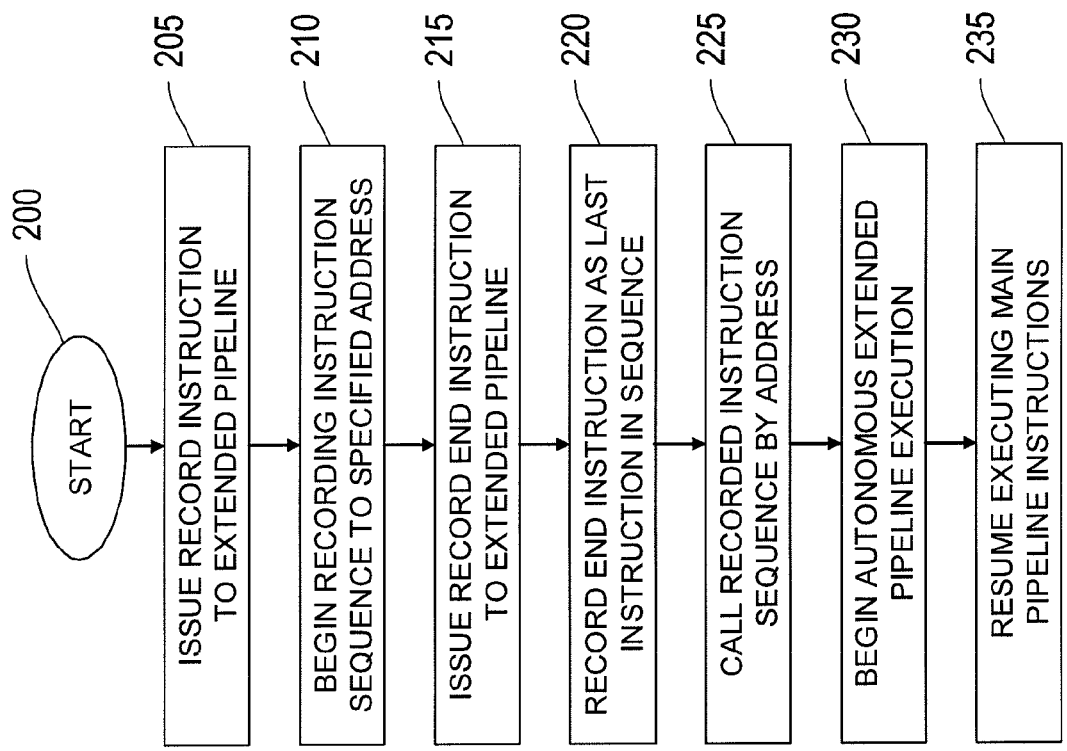
FIG. 8 is a flow chart of an exemplary method for recording instruction in an extended instruction pipeline and using such recorded instructions according to at least one embodiment of the invention.

Referring now to FIG. 8, this Figure is a flow chart of an exemplary method for recording instructions in an extended instruction pipeline and using such recorded instructions according to at least one embodiment of the invention. The method begins in step 200 and proceeds to step 205, where the main processor pipeline issues a record instruction sequence instruction to the extended instruction pipeline. In various embodiments, as discussed above, this record sequence instruction will specify a starting memory address. In step 210, the extended pipeline begins recording the sequence of instructions following the record instruction in a memory structure accessible by the extended pipeline at the starting location specified in the record instruction. It should be appreciated that, as discussed herein, in step 210 the extended pipeline may also begin executing the sequence of instruction in addition to recording them.

In step 215, the main pipeline issues the record end instruction to the extended pipeline causing the latter to stop recording the instruction sequence. In various embodiments, as indicated in step 220, the extended instruction pipeline may record the end record instruction as the last instruction in the current sequence. As discussed above, after the instruction sequence has been recorded, the main processor pipeline can call the instruction sequence with a single run instruction and effectively decouple the extended pipeline from the main pipeline, as exemplified in the remaining method steps of FIG. 8.

In step 225, the main processor pipeline calls the recorded instruction sequence. In various embodiments as illustrated in FIGS. 6-7 and discussed in the corresponding description, this is accomplished by issuing a run instruction that specifies the start address of the instruction sequence. In this manner, different sequences may be called with the same run instruction by specifying different start addresses. By calling this recorded instruction, the main pipeline effectively decouples the extended pipeline so that the latter may begin fetching and executing instructions autonomously, as stated in step 230. As discussed above, in various embodiments, the extended pipeline has its own front end for this purpose. In various embodiments, the extended pipeline will continue operating in the autonomous mode, that is independent of main pipeline's fetch-execution cycles, until the "end" or "record end" instruction that was previously recorded at the end of the current instruction sequence is encountered. In various embodiments, this instruction will cause the extended pipeline to cease autonomous execution and, as stated in step 235, to resume executing instructions issued by the main pipeline via the queue, as discussed in the related application entitled, "System and Method for Selectively Decoupling a Parallel Extended Processor Pipeline."

The embodiments of the present inventions are not to be limited in scope by the specific embodiments described herein. For example, although many of the embodiments disclosed herein have been described with reference to systems and method for recording instruction sequences in a microprocessor including a main instruction pipeline and an extended instruction pipeline in a SIMD microprocessor architecture, the principles herein are equally applicable to other aspects of microprocessor design and function. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A microprocessor architecture having decoupled fetch-execution cycles for at least two instruction pipelines, comprising:
    a main instruction pipeline operating at a first clock frequency; and
    an extended instruction pipeline,
    wherein the main instruction pipeline is configured to issue:
        a begin record instruction to the extended instruction pipeline, causing the extended instruction pipeline to begin recording a sequence of instructions issued by the main instruction pipeline; and
        a single instruction comprising a starting address of the sequence of recorded instructions to the extended instruction pipeline, causing the extended instruction pipeline to execute the sequence of recorded instructions;
    wherein the single instruction or the begin record instruction causes the extended instruction pipeline to switch to an autonomous mode of operation from a main instruction pipeline controlled mode of operation,
    wherein operating in the autonomous mode of operation comprises fetching and executing instructions from the sequence of recorded instructions independent from the main instruction pipeline, through a front end portion of the extended instruction pipeline, the front end portion of the extended instruction pipeline operating at a second clock frequency that is different from the first clock frequency, thereby decoupling the fetch-execution cycles of the main instruction pipeline from the extended instruction pipeline.

2. The microprocessor architecture according to claim 1, wherein the begin record instruction specifies a starting memory address of a memory structure accessible by the extended instruction pipeline at which to begin storing the issued sequence of instructions.

3. The microprocessor architecture according to claim 2, wherein the begin record instruction instructs the extended instruction pipeline to execute the issued sequence of instructions.

4. The microprocessor architecture according to claim 2, wherein a microprocessor core for implementing the main instruction pipeline maintains a plurality of instruction sequence start addresses.

5. The microprocessor architecture according to claim 1, wherein the main instruction pipeline is further configured to issue an end record instruction to the extended instruction pipeline to stop recording instructions.

6. The microprocessor architecture according to claim 5, wherein the end record instruction is issued by the main instruction pipeline in the sequence of instructions and is recorded as the last instruction of the sequence of instructions.

7. The microprocessor architecture according to claim 6, wherein execution of the end record instruction by the extended instruction pipeline causes the extended instruction pipeline to switch back from the autonomous mode of operation to the main instruction pipeline controlled mode of operation.

8. A method of decoupling the fetch-execution cycles of at least two instruction pipelines in a microprocessor-based system having a main instruction pipeline operating at a first clock frequency and an extended instruction pipeline, the method comprising:
    sending a record instruction from the main instruction pipeline to the extended instruction pipeline to cause the extended instruction pipeline to begin recording an instruction sequence;
    sending an end record instruction from the main instruction pipeline to the extended instruction pipeline to cause the extended instruction pipeline to stop recording the instruction sequence;

sending a single run instruction comprising a starting address of the sequence of recorded instructions from the main instruction pipeline to the extended instruction pipeline to cause the extended instruction pipeline to begin executing the recorded sequence of instructions; and switching the extended instruction pipeline to an autonomous mode of operation from a main instruction pipeline controlled mode of operation, wherein operating in the autonomous mode of operation comprises fetching and executing instructions from the recorded sequence of instructions independent from the main instruction pipeline, through a front end portion of the extended instruction pipeline, the front end portion of the extended instruction pipeline operating at a second clock frequency that is different from the first clock frequency, thereby decoupling the fetch-execution cycles of the main instruction pipeline from the extended instruction pipeline.

9. The method according to claim 8, wherein sending the record instruction comprises specifying a starting memory address of a memory structure accessible by the extended instruction pipeline at which to begin storing the instruction sequence.

10. The method according to claim 9, wherein a microprocessor core for implementing the main instruction pipeline maintains a plurality of starting memory addresses.

11. The method according to claim 8, wherein sending the record instruction comprises sending an instruction that causes the extended instruction pipeline to execute the instruction sequence.

12. The method according to claim 8, wherein sending the single run instruction comprises causing the extended instruction pipeline to begin the autonomous mode of operation.

13. The method according to claim 12, wherein sending the end record instruction from the main instruction pipeline to the extended instruction pipeline comprises causing the extended instruction pipeline to record the end record instruction as the last instruction in the recorded sequence.

14. The method according to claim 13, further comprising ending the autonomous mode of operation when the end record instruction is executed by the extended instruction pipeline and returning to a main pipeline controlled mode of operation.

15. In a microprocessor-based system comprising a main instruction pipeline operating at a first clock frequency and an extended instruction pipeline, a method of decoupling the fetch-execution cycles of at least two instruction pipelines in the microprocessor-based system for the extended instruction pipeline to reduce microprocessor overhead comprising:

issuing a begin record instruction from the main instruction pipeline to the extended instruction pipeline, the begin record instruction including a starting address to begin storing an instruction sequence;

subsequently recording the instruction sequence supplied by the main instruction pipeline;

issuing an end record instruction from the main instruction pipeline to the extended instruction pipeline causing the extended instruction pipeline to record the end record instruction as the last instruction in the sequence, wherein future calls to the recorded instruction sequence are made by sending a run instruction from the main instruction pipeline to the extended instruction pipeline, the run instruction specifying the starting address of the recorded instruction sequence and causing the extended instruction pipeline to begin a mode of autonomous operation; and operating in the mode of autonomous operation, wherein autonomous operation comprises the extended instruction pipeline fetching and executing instructions from the recorded instruction sequence independent from the main instruction pipeline, through a front end portion of the extended instruction pipeline, the front end portion of the extended instruction pipeline operating at a second clock frequency that is different from the first clock frequency, thereby decoupling the fetch-execution cycles of the main instruction pipeline from the extended instruction pipeline, until the end record instruction is encountered.

* * * * *